(12) United States Patent
Susnjara

(10) Patent No.: US 6,665,580 B1
(45) Date of Patent: Dec. 16, 2003

(54) AUTOMATIC CUTTING TOOL MANAGEMENT SYSTEM FOR A COMPUTER NUMERIC CONTROLLED MACHINING SYSTEM

(75) Inventor: Kenneth J. Susnjara, Birdseye, IN (US)

(73) Assignee: Thermwood Corporation, Dale, IN (US)

(*) Notice: Subject to any disclaimer, the term of this patent is extended or adjusted under 35 U.S.C. 154(b) by 458 days.

(21) Appl. No.: 09/664,527

(22) Filed: Sep. 18, 2000

(51) Int. Cl.$^7$ .............................................. G06F 19/00
(52) U.S. Cl. ...................... 700/175; 700/160; 700/169; 700/174; 700/178; 700/179; 700/192; 318/568.1; 318/570; 318/572; 318/573
(58) Field of Search ................................. 700/159, 160, 700/86–89, 169, 173, 174, 175, 176, 177, 178, 179–181, 192, 193; 318/568.1, 570, 572, 573

(56) References Cited

U.S. PATENT DOCUMENTS

| | | | | |
|---|---|---|---|---|
| 3,744,124 A | * | 7/1973 | Gardner | 483/8 |
| 3,783,253 A | * | 1/1974 | Anderson et al. | 318/568.1 |
| 4,309,600 A | * | 1/1982 | Perry et al. | 235/375 |
| 4,370,705 A | * | 1/1983 | Imazeki et al. | 700/79 |
| 4,473,883 A | * | 9/1984 | Yoshida et al. | 700/179 |
| 4,513,366 A | * | 4/1985 | Munekata et al. | 700/178 |
| 4,530,046 A | * | 7/1985 | Munekata et al. | 700/86 |
| 4,543,636 A | * | 9/1985 | Noda et al. | 700/179 |
| 4,547,854 A | * | 10/1985 | Hashimoto et al. | 700/183 |
| 4,550,375 A | * | 10/1985 | Sato et al. | 700/169 |
| 4,608,644 A | * | 8/1986 | Kiya | 700/175 |
| 4,608,645 A | * | 8/1986 | Niwa et al. | 700/176 |
| 4,616,322 A | * | 10/1986 | Niwa et al. | 700/179 |
| 4,750,105 A | * | 6/1988 | Ohkawa et al. | 700/86 |
| 4,890,306 A | * | 12/1989 | Noda | 377/15 |
| 4,972,322 A | * | 11/1990 | Asakura et al. | 700/185 |
| 5,152,641 A | * | 10/1992 | Overmyer et al. | 408/1 R |
| 5,251,144 A | * | 10/1993 | Ramamurthi | 700/177 |
| 5,289,382 A | * | 2/1994 | Goto | 700/179 |
| 5,342,275 A | * | 8/1994 | Yanase et al. | 483/1 |
| 5,632,579 A | * | 5/1997 | Susnjara | 409/137 |
| 6,350,222 B2 | * | 2/2002 | Susnjara | 483/1 |
| 6,416,450 B2 | * | 7/2002 | Susnjara | 483/47 |

OTHER PUBLICATIONS

US 2002/0002419 A1, Yamazaki et al., filed Jan. 3, 2002, Method of Controlling Lifetime of Complex Tool.*

* cited by examiner

Primary Examiner—Ramesh Patel
(74) Attorney, Agent, or Firm—Stevens, Davis, Miller & Mosher, LLP

(57) ABSTRACT

A method and apparatus for monitoring the useful life of machine tools. A controller continuously monitors the amount of time a particular tool has been used as well as the materials the tool has been used to machine. A useful lifetime of the tool is estimated based on the characteristics of the tool. When the amount of time the tool has been used, adjusted based on the materials used, reaches the useful life span of the tool, the controller directs the machine to remove the tool from service and retrieve a duplicate tool for further machine operations.

21 Claims, 3 Drawing Sheets

AUTOMATIC CUTTING TOOL MANAGEMENT SYSTEM FOR A COMPUTER NUMERIC CONTROLLED MACHINING SYSTEM

FIELD OF THE INVENTION

The present invention is a system and method for determining the point at which a cutting tool on a Computer numeric controlled machining system has reached the end of its useful life, then automatically replace said tool, utilizing a computer algorithm with user definable parameters, in conjunction with an automatic tool changing system.

BACKGROUND OF THE INVENTION

The condition of a cutting tool is critical to any type of machining operation. Tools that become worn through excessive use can have a negative effect on both the quality and the accuracy of a machining operation. Excessively worn tools may also contribute to collateral problems, such as the premature failure of bearings in routing or milling spindles, or tool breakage. Tools that break due to excessive cutting force, may also result in serious personal injury to operators or others who may work in close proximity to the machining operation.

A problem of the machining industry is the lack of an effective system for automatically monitoring and managing cutting tools during the course of a machining operation. Prior art addresses this problem by utilizing a number of methods, such as monitoring the electrical current of the cutting spindle motor, calculating the total amount of time that a tool has been in use, or the total length that a tool has traveled during the cutting operation. Each of the aforesaid methods has some value in determining the useful lifecycle of a cutting tool, but each takes into account only a single, quantitative factor. They therefore fall short of the principle goal of utilizing each tool through its maximum useful life span under a variety of different conditions, regardless of the many factors contributing to machining tool wears.

To effectively predict the life of cutting tools for a CNC machining center, several factors must be taken into account, including feed speed, the speed at which a tool is fed through a cut; peripheral speed, the surface speed of the outermost diameter of the tool; and tooth/knife progression, the distance that a knife or tooth progresses through the material per revolution of the cutter. The type of material that is being cut is another extremely important factor.

Peripheral speed is a direct function of feed speed, and together, they are part of a simple mathematical equation used for calculating tooth/knife progression. The optimum feed speed is therefore a stable characteristic of each individual cutter, having been determined in advance by simple mathematical calculations. Conversely, the type of material being cut is a variable; therefore no single quantitative factor can be applied.

Taking into account all of the above named factors, it is possible to accurately predict the lifecycle of a tool. However, in doing so, the operator of the machinery becomes burdened with the task of manually tracking the actual time that a tool is engaged in a cutting operation and differentiating the variables associated with numerous types of materials. In mass production situations, it is unrealistic to assume that this could be carried out with an acceptable degree of effectiveness.

SUMMARY OF THE INVENTION

The first object is to effectively monitor and manage the use of cutting tools in a CNC machining system, based on a number of variables, utilizing computerized automation.

A further object is to achieve the first objective with minimal operator intervention.

DETAIL DESCRIPTION OF THE INVENTION

Figure 1:
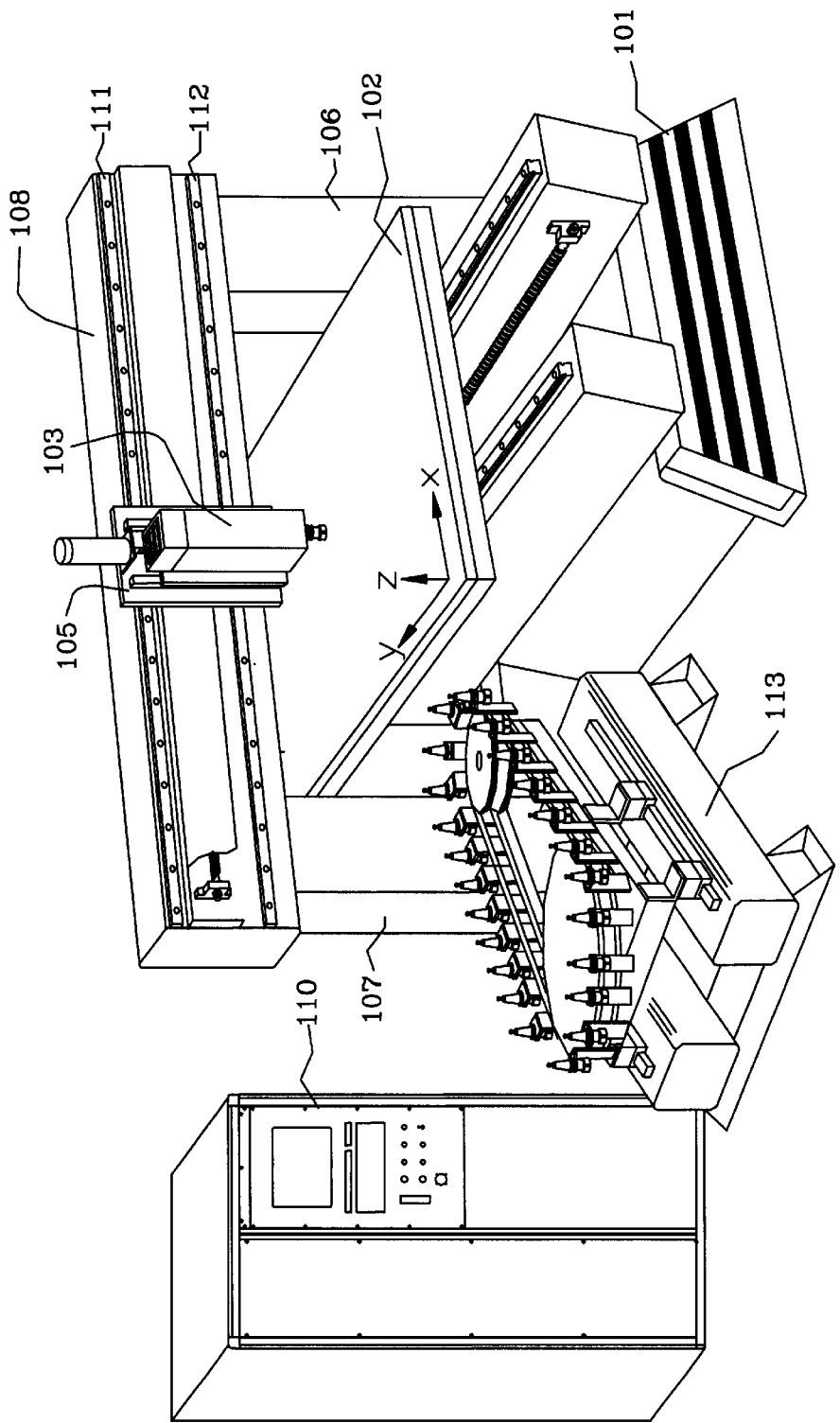
FIG. 1 illustrates the embodiment of a computer numeric controlled machining system.

Referring to the drawing in FIG. 1, there is illustrated, an embodiment of a computer numeric controlled (CNC) machining system, which generally includes a base member 101, a worktable 102, a gantry, a toolhead support assembly 105, and an electric spindle, 103. The gantry, includes a pair of leg members, 106 and 107, rigidly secured at their lower ends to the base member and a transversely disposed section 108, supported on the leg sections and spanning above the worktable. The base member is formed of steel sections welded together to provide a rigid and stable foundation. Worktable 102, is mounted horizontally with the surface parallel to the x and y axes plane and is adapted to be displaced longitudinally relative to the base member or along an y-axis. The front face of transverse section 108, is provided with a pair of vertically spaced, transversely disposed rails 111, and 112, onto which toolhead support assembly 105, is mounted and displace able transversely or along an x-axis. Electric spindle 103, is mounted on the bottom of the toolhead support assembly and is adapted to be displaced vertically by the same. Each of worktable 102, toolhead support assembly 105, and electric spindle 103, is displace able along its respective axis by a feeds crew arrangement driven by an AC servo motor. The operation of such servo motors is controlled by a programmable computer-numeric controller (CNC) 110 to provide for movement of a tool mounted on the toolhead along a motion path to perform a work function such as routing, shaping, drilling and the like on a workpiece mounted on the worktable. Instead of the worktable being displace able and the gantry being stationary as described, the worktable can be stationary and the gantry may be displace able along the Y-axis to provide displacement between the gantry and the worktable. An automatic tool changer 113, comprises a rotary tool magazine, a rotating means for said tool magazine, and a means for sensing the position of said magazine.

The severity of the cutting operation as it relates to tool wear is virtually always a function of material type. In the present invention, each individual tool is placed in a designated position within the tool magazine of an automatic tool changer. Each tool in said tool magazine is represented by a tool number in a tool table in the CNC controller. A control time, based on the type of tool, cutting speed, and the peripheral speed of the tool, is entered into said tool table. The control time is permanently assigned to each tool in the tool table. A the wear factor, based on a control material, is established for each of the various materials to be processed. The wear factor is an adaptive limitation, expressed as a numeric value between 1 and 10, to be assigned to each type of material to be processed based on the cutting severity associated with the material. The numeric value is then incorporated into each workpiece processing program, based on the type of material to be processed. The amount of time that a particular tool is allowed to perform a cutting operation is based on the numeric value. When the workpiece processing program is being run, the total time allowed for the tool to operate will be decremented at a faster or slower rate, depending on the numeric value applied to the wear factor. The total amount of time that a given tool has been in use is continuously tracked, even if said tool is taken out of service due to changing to a different processing program. If said tool is recalled again from the tool magazine, the decrementing of the allowable run time for said tool continues from the point at which it ended in the previous operation. However, said tool may later be applied to a different type of material in a different workpiece program, which has been assigned a different wear factor value. If this occurs, the allowable run time for said tool would decrement at the newly assigned value, beginning at the point at which it was previously removed from service. The total allowable operating time for said tool may thus be changed, but the time that said tool was used in the previous operation and the resultant calculated wear would be taken into account. When said tool has reached its maximum useful life span, it will automatically be replaced with a substitute tool from the tool magazine. Each successive tool in the series will be likewise substituted at the end of its useful lifespan.

Figure 2:
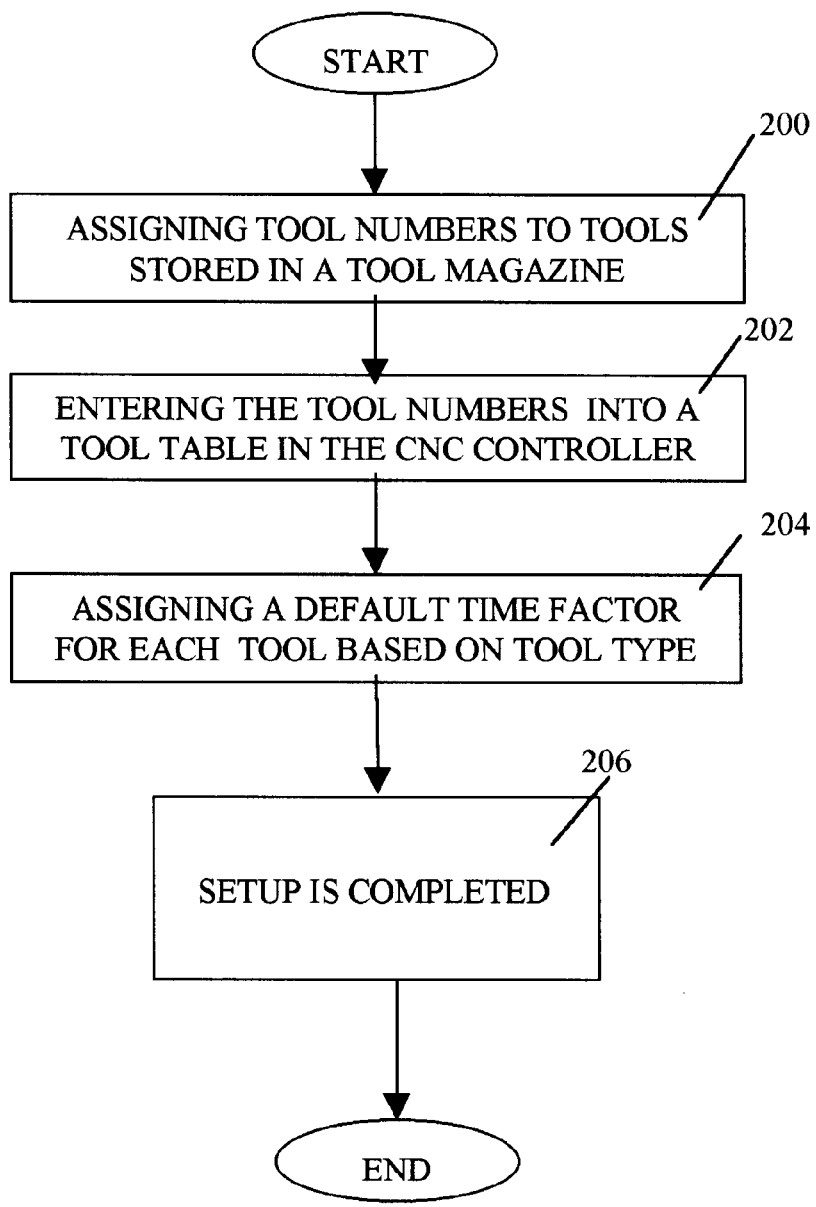
FIG. 2 illustrates an algorithm of organizing tools used in the present invention.

FIG. 2 illustrates an algorithm of organizing tools to be used in the present invention. The automatic tool changer has a magazine with various receptacles to receive various tools. Each of the receptacles has a unique address. A tool number is assigned to each of the various tools received in the receptacles, as shown in step 200. A tool table in the CNC controller is used to collect all the tool numbers, as shown in step 202. For each tool, a default time factor is assigned based on tool type, i.e. router bits, drilling bits, etc., as shown in step 204. Setup is then completed, as shown in step 206.

Figure 3:
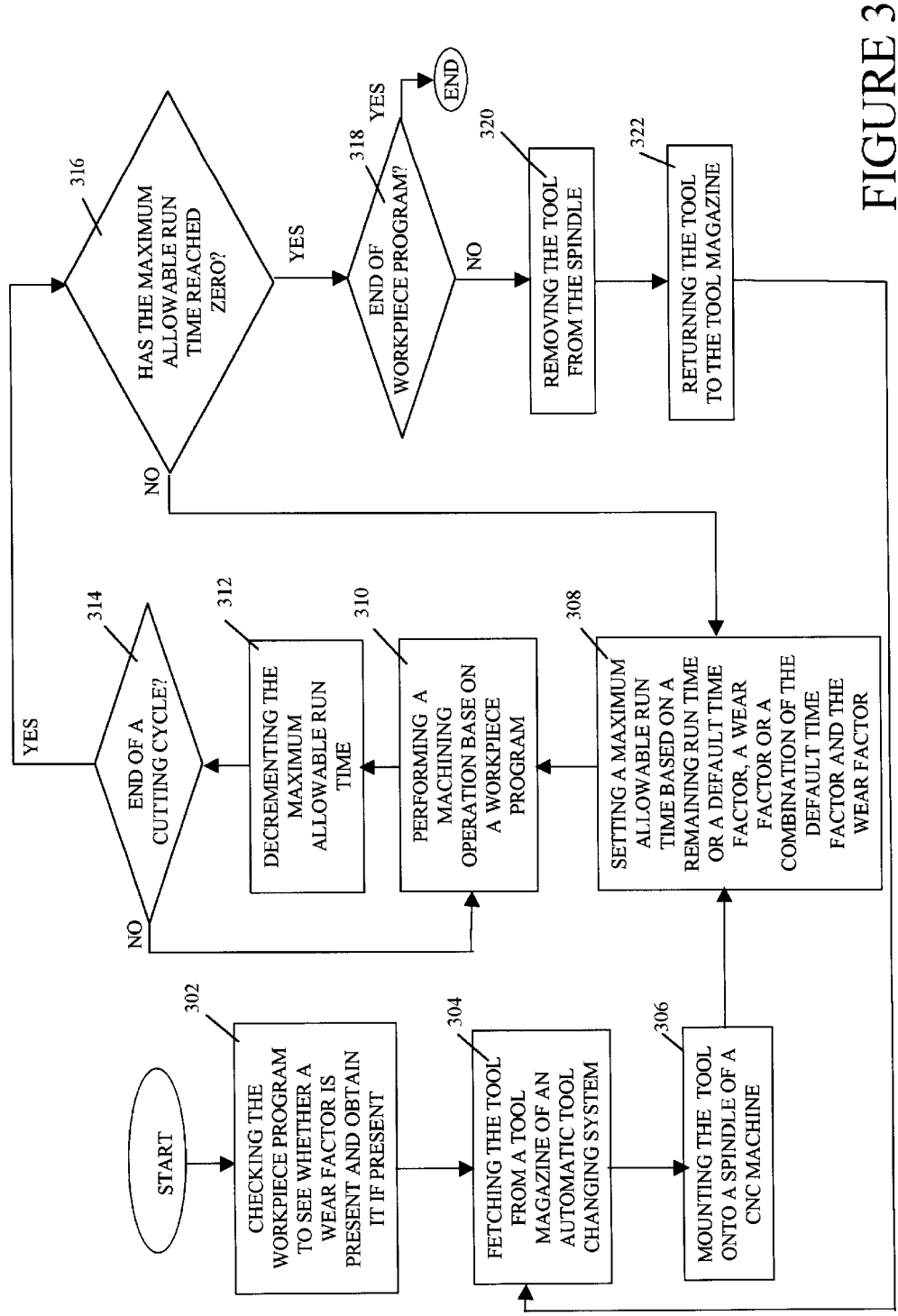
FIG. 3 illustrates a logic diagram of an automatic tool change sequence.

FIG. 3 illustrates a flow chart that exemplifies the process of an automatic tool substitution. While the presently referenced chart exemplifies the substitution cycle for one specific tool, it is to be understood that multiple tools may be assigned to a single workpiece program for the purpose of performing discrete operations within the program, and each separate tool may be assigned a wear factor and may likewise be automatically substituted. Referring to FIG. 2, after starting the algorithm, there is a check to see if a wear factor for a tool based on the type of material being processed is contained in the beginning of the workpiece program as shown in step 300. The tool is then fetched from a tool magazine of an automatic tool changing system to the CNC machining system, as shown in step 304. The tool is mounted on a spindle of the machine, as shown in step 306. A maximum allowable run time is set based on either a combination of a default time factor and a wear factor, or a remaining run time, as shown in step 308. Machining operations written in the workpiece program are then being executed, as shown in step 310. As the machine operations are being implemented, a counter keeps track of the remaining time left on the tool, by decreasing the maximum allowable run time, as shown in step 312. Even though a down counter is used in this flow chart, other schemes of tracking time can also be used, such as using an up counter. A determination is made on whether an end of a cutting cycle is reached, as shown in step 314. If an end of a cutting cycle is not reached, then steps 310, 312 and 314 are repeated. If an end of a cutting cycle is reached, a determination of whether the maximum allowable run time has been decremented down to zero, as shown in step 316. If it has not been decremented down to zero, then the remaining run time are set as a maximum allowable run time, as shown in step 308. If the maximum allowable run time has been decremented down to zero, then a determination of whether an end of the workpiece program is reached, as shown in step 316. If an end of the workpiece program is reached, then the flow chart ends, as shown in step 318. If an end of the workpiece program is not reached, then the old tool from the spindle is removed, as shown in step 320. The removed old tool is returned to the tool magazine, as shown in step 322. The old tool can then be sharpened and reused in future operations. The cycle from steps 306 to 322 is then repeated.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method for operating a machine having a multi-tool magazine, comprising the following steps:
   using a tool to machine various materials on a worktable of the machine and storing the tool in the magazine of the machine when the tool is not being used;
   monitoring a length of time the tool has been used during machining operations;
   determining an operational time for the tool based on the amount of time the tool has been used during each machine operation using the tool and a wear factor associated with the material being machined; and
   discontinuing use of the tool after completing an operation when the operational time reaches a predetermined amount.

2. The method according to claim 1 wherein the operational time has an initial value based upon a type of tool used, a cutting speed of the tool and a feed rate of the tool.

3. The method according to claim 1 wherein the step of determining comprises reducing the operational time based on the amount of time the tool has been used during each operation.

4. The method according to claim 3 wherein the operational time is reduced at a faster or slower rate depending on the wear factor.

5. The method according to claim 4 wherein the wear factor is a numerical value on a sliding scale that increases or decreases the reduction rate of the operational time.

6. The method according to claim 5 wherein the wear factor is based on a resistance-to-cut characteristic of the material.

7. The method according to claim 1 further including storing the tool in the magazine when no machine operations require use of the tool and the operational time has not reached the predetermined amount.

8. The method according to claim 7 wherein during storage of the tool, the operational time of the tool before storage is maintained.

9. The method according to claim 1 further including replacing the tool with a duplicate tool when the operational time reaches the predetermined amount.

10. A machine comprising:
    a tool mounted in a toolhead of the machine or stored in a tool magazine;
    a controller monitoring an amount of time the tool has been used machining various materials and adjusting the amount of time based upon wear factors associated with the materials;

wherein following each machining operation, the controller directs a substitution of the tool with a duplicate tool when the amount of time in association with the wear factors triggers a total operational time.

11. The machine according to claim 10 wherein the tool magazine holds the tool, the duplicate tool and other tools that are not in use in machine operations.

12. The machine according to claim 10 wherein the total operational time is a computation based on a type of the tool, a cutting speed of the tool and a feed rate of the tool.

13. The machine according to claim 10 wherein the total operational time corresponds to a time frame the tool can be used before it requires sharpening.

14. The machine according to claim 10 wherein each wear factor is based on a resistance-to-cut characteristic of a respective material.

15. The machine according to claim 10 wherein during each machining operation, the controller combines the amount of time for the machining operation and a respective wear factor for the material machined and adds the combination onto a running operating time.

16. The machine according to claim 15 wherein the amount of time is added to the running operating time at a faster or slower rate depending on the wear factor.

17. The machine according to claim 16 wherein when the running operating time exceeds the total operational time, the controller directs the substitution.

18. A method for operating a machine having a multi-tool magazine, comprising the following steps:

1) placing a plurality of tools in the magazine of the machine;
2) entering a control time for each tool representing an amount of time the tool can be used;
3) placing a material to be machined on a worktable of the machine;
4) establishing a wear factor for the material;
5) placing a selected tool into a spindle of the machine;
6) machining the material using the selected tool;
7) reducing the control time of the selected tool by a combination comprising an amount of time required to machine the material and the wear factor;
8) replacing the selected tool with a duplicate tool when the control time becomes less than or equal to zero; and
9) repeating steps 3 through 8 as necessary for each of the plurality of tools.

19. The method according to claim 18, wherein the control time is reduced by the amount of time at a faster or slower rate depending upon the wear factor.

20. The method according to claim 19 wherein the wear factor is a numerical value on a sliding scale.

21. The method according to claim 20 wherein a higher numerical value indicates a faster reduction of the control time and a lower numerical value indicates a slower reduction of the control time.

* * * * *